United States Patent [19]
Piele

[11] Patent Number: 5,298,908
[45] Date of Patent: Mar. 29, 1994

[54] INTERFERENCE NULLING SYSTEM FOR ANTENNAS

[75] Inventor: Gerald H. Piele, Salt Lake City, Utah

[73] Assignee: Unisys Corporation, Blue Bell, Pa.

[21] Appl. No.: 125,832

[22] Filed: Nov. 27, 1987

[51] Int. Cl.$^5$ .................... H01Q 21/06; H01Q 21/24; H04B 7/10

[52] U.S. Cl. .................... 342/363; 455/304

[58] Field of Search ............ 342/361, 362, 363, 365; 455/304

[56] References Cited

U.S. PATENT DOCUMENTS 4,313,220 1/1982 Lo et al. .................... 455/304

*Primary Examiner*—Theodore M. Blum
*Attorney, Agent, or Firm*—John B. Sowell; Mark T. Starr

[57] ABSTRACT

An interference nulling system is provided which nulls out all types of interference signals received in different lobes of the receiving antenna. The data to be received is transmitted from a high quality circular polarized transmitter antenna having the same polarization as the data receiving port of the receiving antenna. The receiving antenna also has a receiving port whose circular polarization is orthogonal to the antenna port receiving the data so that this latter channel contains only interference signals. The interference signals in this latter channel are correlated with the interference components in the data channel. A control loop is employed to adaptively adjust the phase (or delay) and amplitude of the sample of the interference signal and the adaptively adjusted interference signal is subtracted from the data signal which contains some of the interference signals, thus, providing a clean data signal.

18 Claims, 7 Drawing Sheets

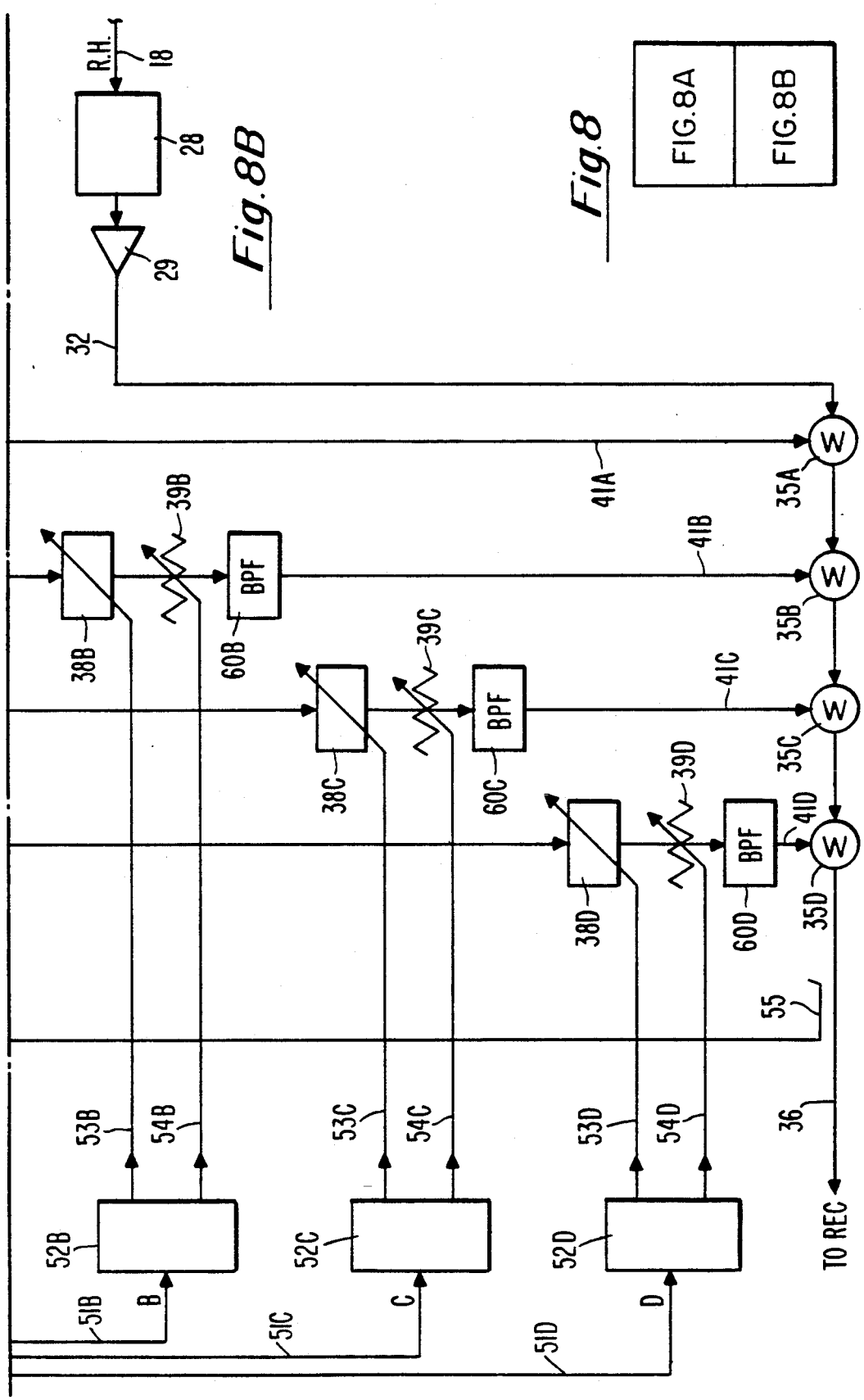

INTERFERENCE NULLING SYSTEM FOR ANTENNAS

BACKGROUND OF THE INVENTION

1. Field of the Invention

The present invention relates to nulling systems adapted to separate desired received data link signals from interference signals and/or jamming signals. More specifically, the present invention relates to right hand and left hand circular polarized electric field vectors or components and to a method of eliminating interference signals sensed at the receiver of the data link.

2. Description of the Prior Art

Heretofore, data link systems have been made which employ linear polarization (LP); right hand circular polarization (RHCP); and left hand circular polzrization (LHCP) of the polarized electric field vectors.

The problem with employing linear polarization in an air to ground or ground to air data link is that the polarization of the received signals are dependent on the orientation of the antenna at the aircraft transmitter, and when the antenna is rotated with maneuvers of the aircraft, the orientation of the electric field vector is also changed and may become cross-polarized with the orientation of the receiving antenna at the ground station so that no signal or an attenuated signal is received. For this reason, data links employing aircraft have tended to employ right hand or left hand circular polarization at the antennas.

A typical prior art example is found in U.S. Pat. No. 4,051,474 which teaches an array of eight transmitting and receiving antennas which are adapted for radar use. The dipole antenna array polarization can be adjusted to be orthogonal to the polarization of a single interference signal in the main beam. The problem with this nulling system is that the system can only be set to overcome one interference signal of unique orientation and does not deal with interference arising in the side lobes or back lobes or dynamic interference signals.

In my copending application Ser. No. 874,448, filed 2 Feb. 1978, a polarization nulling system is taught which is capable of dealing with a single polarization interference signal at a time and only interference signals that are in the main lobe of the antenna radiation pattern.

It would be extremely desirable to provide a nulling system that deals with interference arising in the main lobe as well as the side lobes or back lobes and is also capable of dealing with more than one interference signal of different polarizations at the same time.

SUMMARY OF THE INVENTION

It is a principal object of the present invention to provide a novel interference nulling system which deals with more than one interference signal which may occur in the main lobe, the side lobes or the back lobes.

It is another principal object of the present invention to provide a data link system which transmits the data link signal on one polarization, either left hand or right hand circular polarization, and receives signals on both left hand and right hand circular polarization so that the signals received on the polarization orthogonal to the transmitted data link signal are identified as interference signals.

It is another principal object of the present invention to receive interference signals on one port of a receiving antenna and receive data link signals, which contain interference signals, on the other port of the same antenna and to sample the interference signals in the data link signal path so as to correlate the sample signal with the interference signal and to null out the interference signal.

It is a general object of the present invention to provide a nulling system in the form of a compact circuit structure which may be packaged in a small box or container at the receiving antenna.

It is another general object of the present invention to provide a nulling system capable of nulling out multiple interference signals within a wide band.

It is another general object of the present invention to provide means for switching the polarization of the receiving antenna and the transmitting antenna to avoid similar or identical orientation with interference signals so as to optimize the received data link signal.

It is another general object of the present invention to separate the desired data link signal from the interference signal by generating highly accurate circular polarized signals at the transmitter and the receiver.

It is another general object of the present invention to provide an adaptive controller which automatically adjusts the amplitude and phase of the interferring signal samples so as to null the component of interference in the data signal channel.

According to these and other objects of the present invention, there is provided a data link system having an extremely high quality circular polarized transmitting antenna and a high quality identically circular polarized receiving antenna for receiving data link signals. The receiving antenna is also provided with a high quality circular polarized receiving port which is orthogonal to the antenna port which receives the data link signals thus assuring that little or no data link signal is present on the orthogonally polarized port and providing a true sample of the interference signal isolated from the desired data link signal. A sample of the signal in the data link signal channel is multiplied in an error detector with the sample of the interference signal in the channel containing the interference signal so as to produce a DC error signal output that is applied to an adaptive controller which adjusts the phase (delay) and amplitude of the interference signal. The interference signal is summed with the desired data link signal containing interference signals so as to null out the interference signal in the channel containing the data link signal and the interference signals.

BRIEF DESCRIPTION OF THE DRAWINGS

FIGS. 8A and 8B are a schematic block diagram of a preferred embodiment nulling system showing a plurality of nulling loops of the type employed to eliminate a plurality of interference signals;

DESCRIPTION OF THE PREFERRED EMBODIEMENTS

Figure 1:
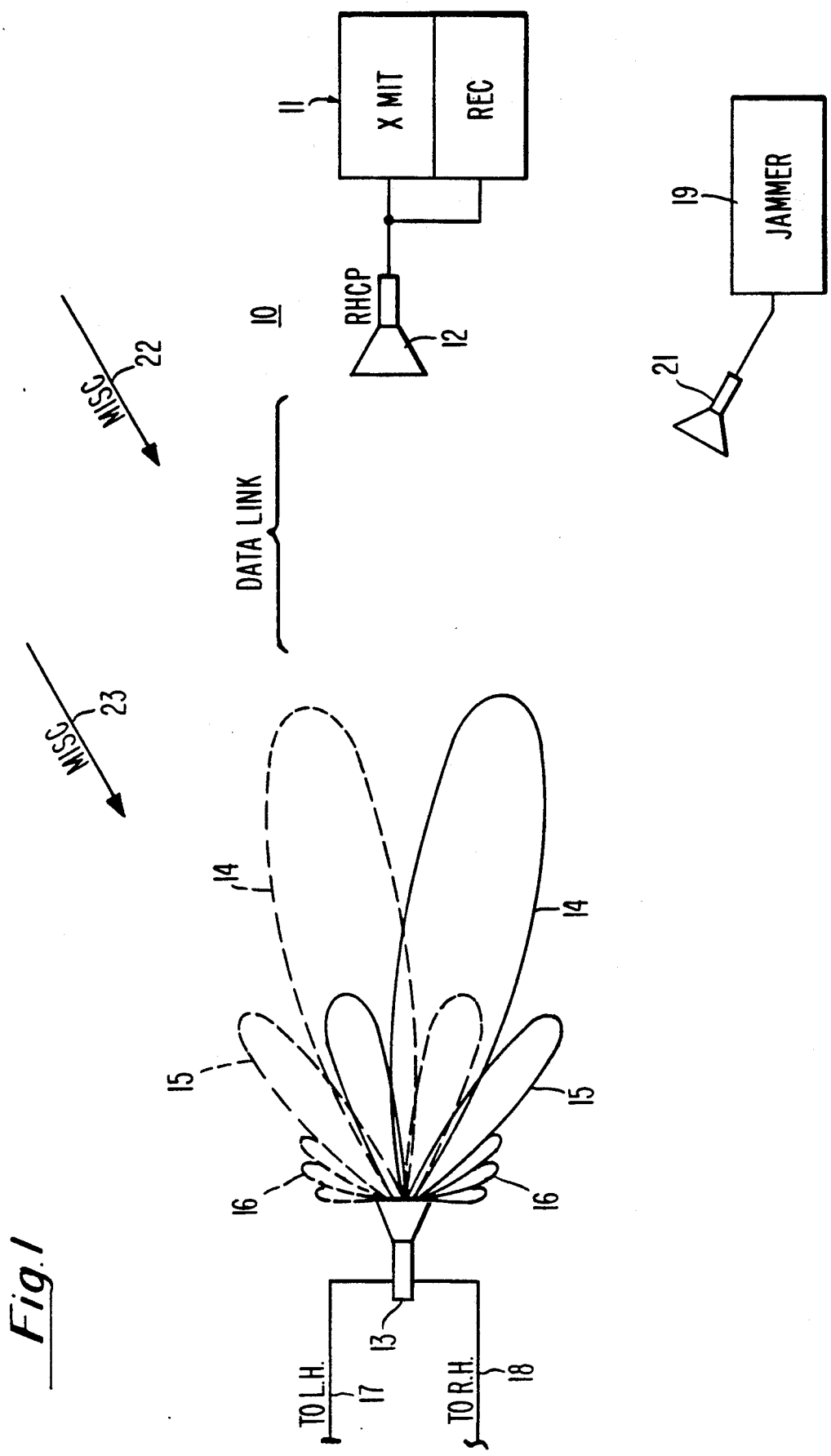
FIG. 1 is a schematic drawing showing receiving antenna patterns and the relative position of the data link transmitter and sources of interference signals.

Refer now to FIG. 1 showing a data link 10 which comprises a transmitter 11 coupled to a switchable dual polarization transmitter-receiving antenna for transmitting and receiving high quality right hand circular polarization or left hand circular polarization data link signals. The transmitted data link signals are received at switchable dual polarization receiving antenna 13 which is also capable of transmitting commands. Antenna 13 is also a high quality circular polarized antenna similar to antenna 12. The antenna pattern for antenna 13 (showing conically scanning or lobing) comprises main lobes 14, side lobes 15 and back lobes 16. The signals received by antenna 13 are delivered to transmission lines 17 and 18 which are connected to a first and second antenna port respectively as will be explained hereinafter.

For purposes of explaining the present invention, it will be assumed that the data link signal will be transmitted on the antenna 12 as a right hand circular polarized signal, however, it will be understood that the desired data link signal may be transmitted as a left hand circular polarized signal. The antenna pattern 14, 15, 16 is shown as having a conically scanned pattern which could be fixed and that the jamming signal of antenna 21 is directed into the main lobe 14 of the conical scan pattern. Miscellaneous intereference signals on arrow 22 are also directed into the main lobe 14 and the miscellaneous signals on arrow 23 are directed into the side lobe pattern 15. Other interference signals may be directed into the back lobe pattern 16 and all such interference signals will appear on the left hand circular polarized port which is connected to transmission line 17. Since the desire data link signal was transmitted as a right hand circular polarized signal, it will be received on the right hand circularized port connected to transmission line 18 and the signal on this transmission line will also contain some interference signals which could be as much as the interference signal contained on transmission line 17 that does not contain any of the desired data link signal.

Figure 2:
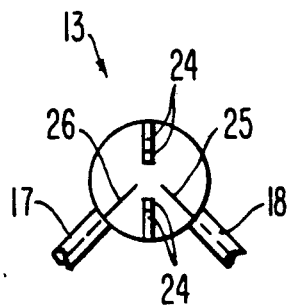
FIG. 2 is an end view of a preferred embodiment circular polarized conical horn antenna having both a right hand and a left hand circular polarized receiving port.
Figure 3:
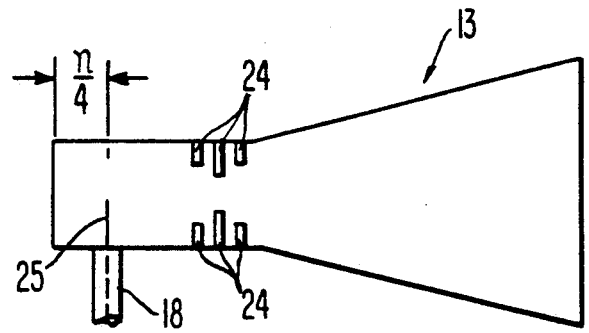
FIG. 3 is a schematic side view of the circular polarized conical horn antenna of FIG. 2 showing the outputs of the receiving ports and a preferred embodiment pin type polarization converter in the horn.

Refer now to FIGS. 2 and 3 showing a circular polarized conical horn receiving antenna 13 having polarization converter pins 24 which cause a 90 degree phase shift of one of the two components of the circular polarized signal. The circular polarized signal of the type being transmitted consists of two plain polarized components separated in space and time 90 degrees from each other. Transmission line 18 is preferably a coaxial cable having a center conductor 25 extending into the horn 13 to provide coupling to the received right hand circular polarized signal and is positioned one quarter wavelength from the end of the horn 13. Similarly, center conductor 26 of transmission line 17 is positioned 90 degrees away from transmission line 18 and probe 25 to receive left hand circular polarized signals. Linearally polarized interference signals will be received at both ports or probes 25, 26 because the linear polarized interference signals pass through the converter 24. These signals are picked up by the ports or probes 25, 26 equally. It will be understood from the previous explanation that the desired data link signal which was transmitted as a right hand circular polarized signal will appear on transmission line 18 with some interference signals, whereas the signal appearing on transmission line 17 will not contain any of the desired data link signal and only interference signals whose magnitude can be lesser or greater than the interference signals on transmission line 18. When the jamming signal is linearly polarized and the plane of polarization of this jamming signal is changed, two possibilities occur. When the jamming signal is in the main lobe, the amount of interference signal received at the two transmission lines and their probes remains equal. However, if the interference signal is directed into the side lobes or back lobes the amount of energy couple into the two probes 25 and 26 will vary depending on the polarization.

Figure 4:
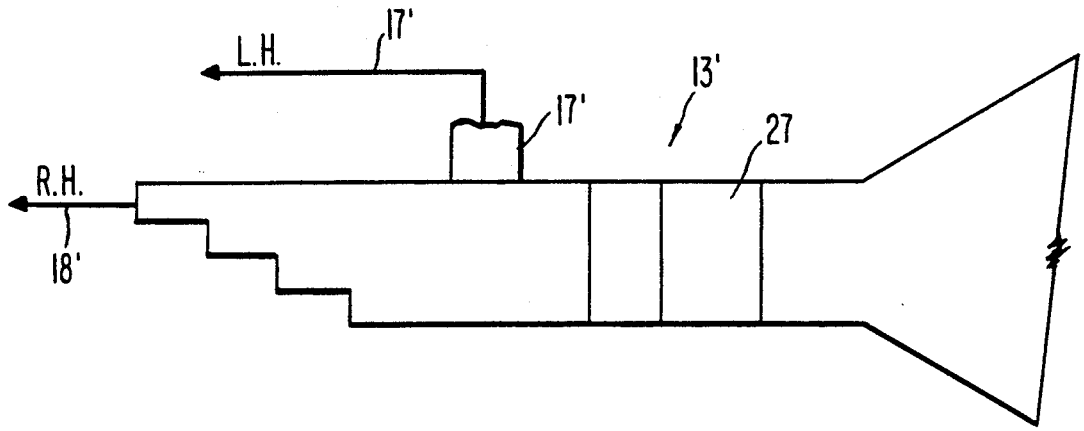
FIG. 4 is a schematic side view of a waveguide type circular polarized conical horn antenna showing wave guard ports and a dielectric slab polarization converter in the horn.

Refer now to FIG. 4 showing a different type microwave circular polarized conical horn 13' having wave guide output ports 17' and 18' and showing a dielectric slab polarization converter 27. The modified embodiment of FIG. 4 is employed for higher powered antennas and consist of a dual mode waveguide transducer capable of separating horizontally and vertically polorized waves incorporating converter 27 and horn antenna 13'.

Figure 5:
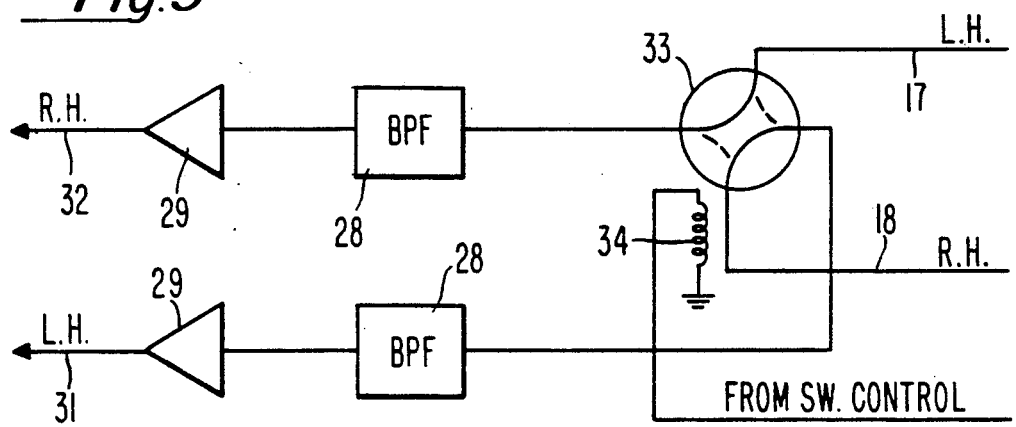
FIG. 5 is a schematic block diagram showing connections to a transfer switch of the type employed to reverse the connections of the outputs of the two antenna ports of the conical horn shown in FIGS. 2 through 4.

Refer now to FIG. 5 showing a transfer switch of the type which may be employed to reverse the connections of the transmission lines at the receiving antenna 13. The same switching technique may be employed at the transmitting antenna 12 as will be explained hereinafter. Transmission lines 17 and 18 are shown connected to band pass filters 28 and to low noise amplifiers 29 to produce output signals on lines 31 and 32 which are the reverse circular polarization of the input signals on lines 17 and 18. To accomplish the reverse connection, a transfer switch 33, physically or electrically reverses the connection of the transmission lines 17 and 18 when activated by switch actuation control solenoid 34 or equivalent means. The switch 34 is preferably positioned to minimize the jamming and interference signals.

Figure 6:
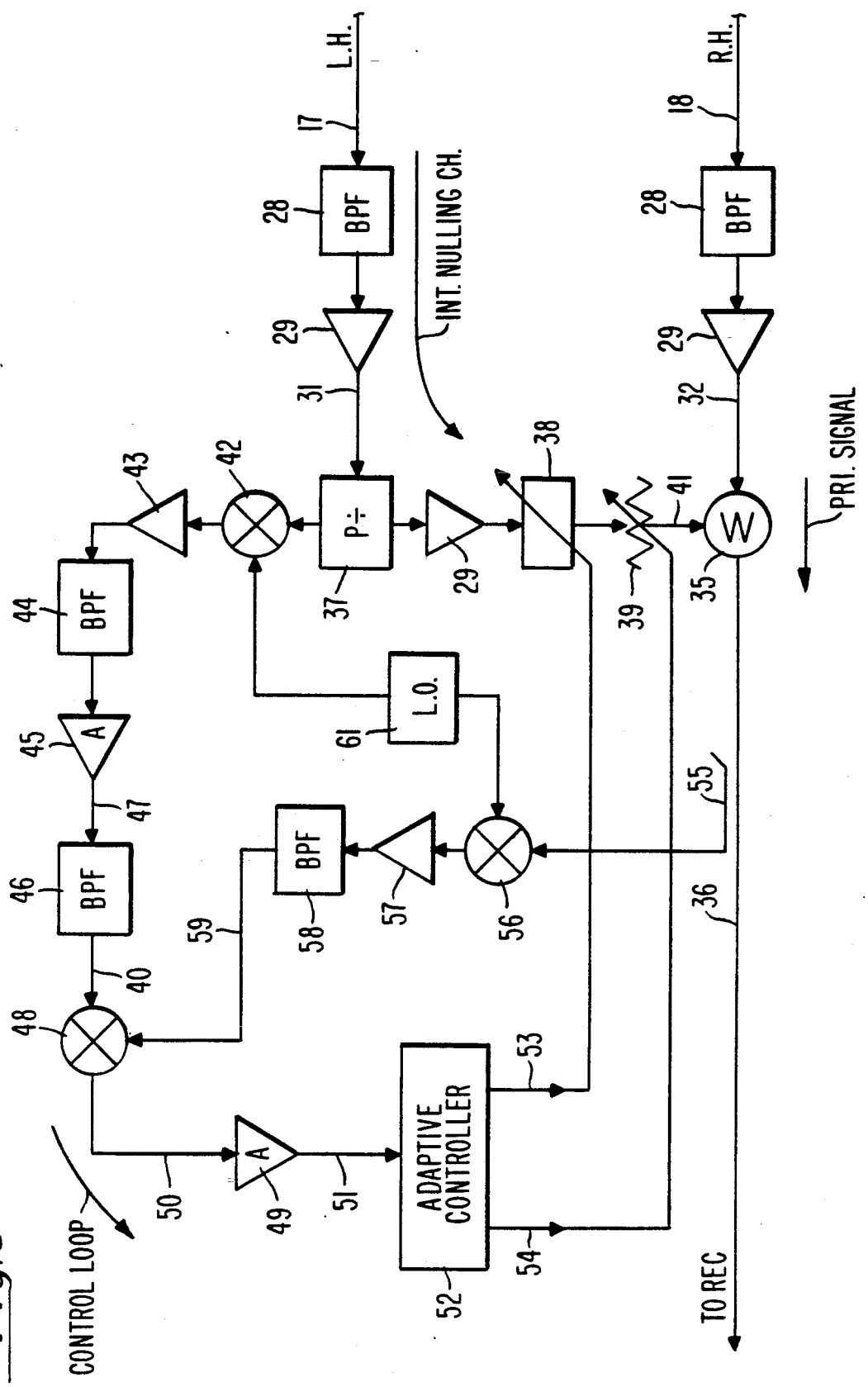
FIG. 6 is a schematic block diagram of a preferred embodiment nulling system showing a single nulling loop of the type employed to eliminate a single interference signal.

Refer now to FIG. 6 showing a block diagram of the preferred embodiment nulling system having a single nulling loop. As explained hereinbefore for purposes of this explanation, the desired data link signal is being presented on the transmission line 18 as a right hand circular polarized signal and has been converted to a complex wave which has sinusoidal components. Similarly, the interference signal on transmission line 17 has interference signals which constitute a complex wave of sinusoidal components and the outputs appearing on lines 31 and 32 may be the same process components or reversed by employing the transfer switch explained hereinbefore with respect to FIG. 5. The data signal channel or primary signal path comprises transmission line 18, filter 28, amplifier 29, output line 32, summing circuit 35 and the output transmission line 36 which is coupled to the receiver (now shown). The interference nulling channel comprises the transmission line 17, output line 31 and its intermediate components 28, 29, power divider 37, a second amplifier 29, adjustable phase (or delay) control 38 and adjustable attenuation control 39 having its processed output on line 41 applied to summing circuit 35. The nulling control loop starts at power divider 37 and includes the down converter mixer 42, amplifier 43, band pass filter 44, a second amplifier 45 connected by line 47 to a second band pass filter 46 whose output on line 40 is applied to the error detector mixer 48. The error detector mixer 48 is preferably a double balanced mixer wired to provide a synchronous detector. The output of error detector 48 is applied to a DC error amplifier 49 and the DC output on line 51 is applied to an adaptive controller 52. Such adaptive controllers are commercially available, however, adaptive controller 52 is preferably a digital controller having a microprocessor which takes the error signal on line 51 and produces output signals on lines 53 and 54 which are adapted to adjust the phase controller 38 and the attenuation control 39 so as to drive the error voltage on line 51 to zero. In the preferred embodiment, the adaptive controller 52 is programmed to adjust and optimize the output on line 53 so as to reduce the input signal on line 51 to a minimum before adjusting and optimizing the output on line 54. It will be understood that an iterative process will produce and optimize and minimize error signals on line 51 as well as following changing dynamic conditions which were not possible in the prior art.

Primary signal channel sampling means comprises a signal sample coupler 55 connected to down converter mixer 56 which produces an output that is amplified at IF amplifier 57 and filtered at IF band pass filter 58 to produce an output signal on line 59 which is applied to the error detector 48. These signals applied to error detector 48 via line 59 contain samples of the desired data signal as well as undesirable residual interference signals of the type received on the left hand channel 17 and are being presented on input line 40 to error detector 48. When the interference signal components on lines 40 and 59 are correlated in frequency, a DC component is produced on line 50 which is processed and amplified to produce the desired error signal on line 51.

Local oscillator 61 provides a fixed local oscillator reference signal for down converting the signal sample at mixer 56 and the inteference sample at mixer 42 to preserve frequency coherence of the signals being applied to the error detector 48.

It will be appreciated that all of the components shown in the nulling system of FIG. 6 may be implemented with inexpensive commercially available components to provide an extremely accurate and stable nulling system which may be packaged into a small box or container that may be mounted on or adjacent to the antenna 13 so that the transmission lines 17 and 18 are extremely short and the delays incurred are insignificant.

Figure 7:
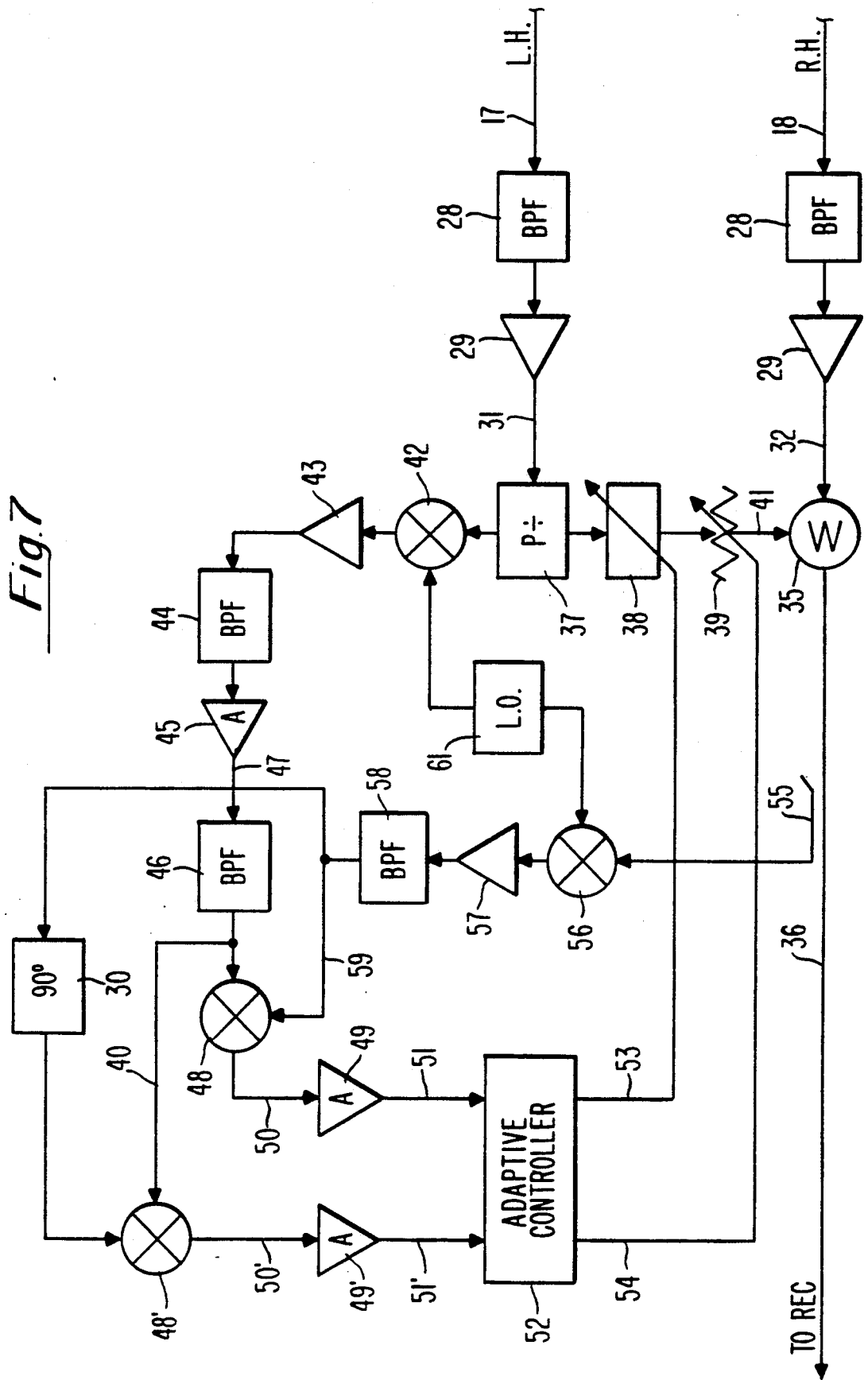
FIG. 7 is a schematic block diagram of a modification of FIG. 6 showing in-phase and quadrature sampling of the interference signal sample.

FIG. 7 is a schematic block diagram showing a modification to FIG. 6 for enhancing the error signal on line 40. The signal on line 40 or 59 may be applied to a quadrature phase shifter 30 to provide a phase shifted signal which is applied to a quadrature channel phase detector 48' along with the unused signal from the other line 59 or 40. The output produced on lines 51, 51' are in-phase and the quadrature error signals may be applied to the adaptive controller 52. By employing the quadrature error detector, the error signal applied to the adaptive controller 52 would always be present regardless of the phase of the interference signal.

Figure 8A:
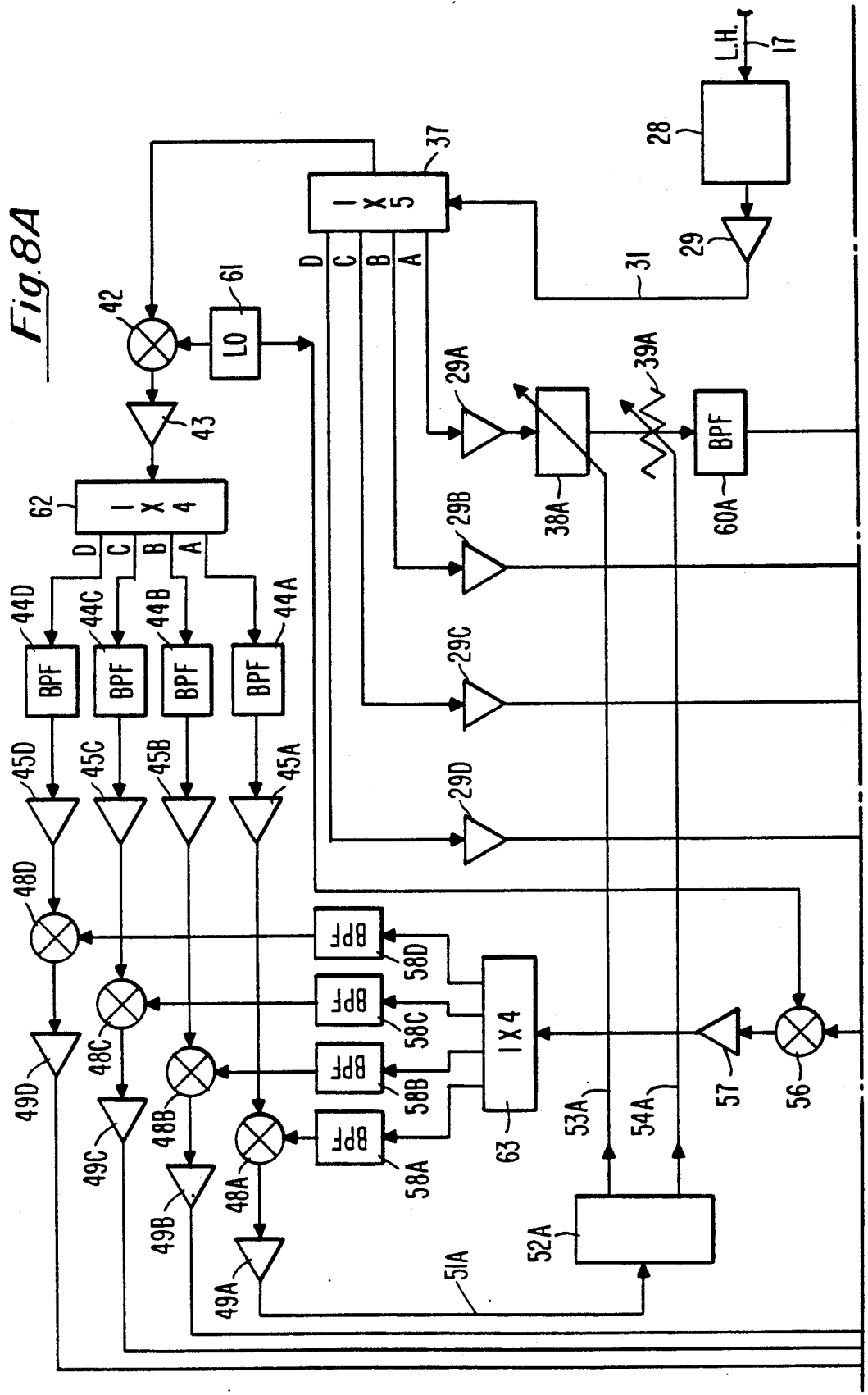

Refer now to FIG. 8 which shows a replication of the nulling control loops and a replication of the sampling means of the FIG. 6 embodiment. The plural loops are designed to handle multiple interference signals within the band of the desire data link signal being transmitted. The elements and components in the FIG. 7 embodiment which are identical to those employed in FIG. 6 are numbered the same as FIG. 6 and do not require detailed explanation of their operation. It will be noted that when the single channel or loop is divided into multiple channels or loops that the suffix designations A to D are employed with the numbers of the components. New power dividers 62 and 63 are employed in the nulling control loop and the sampling means respectively. Power divider 37 is modified and a plurality of band pass microwave filters 60A to 60D are incorporated into output line 41 to define the individual nulling loops. Similarly, individual control loops and sampling loops with their own adaptive controllers 52A to 52D are employed for each of the interference signal bands to be eliminated.

Figure 9:
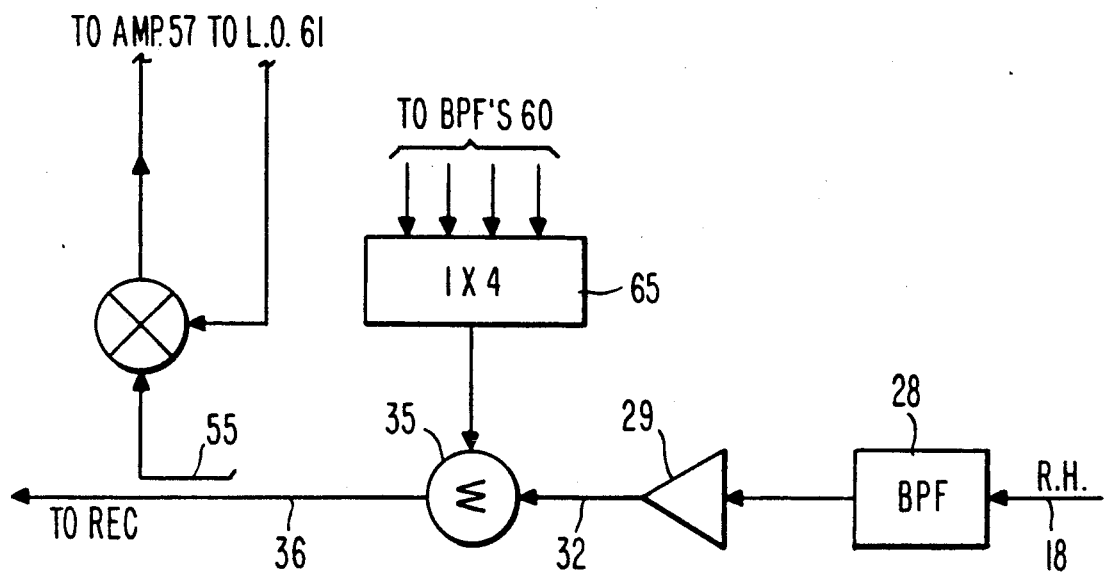
FIG. 9 is a schematic block diagram of a modification of a part of the nulling system of FIG. 7 showing a single summing circuit.

Refer now to FIG. 9 which is a modification of the embodiment shown in FIG. 8 employing multiple channels A to D and a power combiner 65 at a single summing circuit 35. Otherwise, the components and elements of FIGS. 6 and 8 are the same and do not require additional modification. Summing circuit 35 is commercially availble as directional couplers or magic T microwave components. The attenuaters 39 are available as ferrite attenuaters or pin diode attenuaters. The phase shifter 38 may be a tap delay line with diodes for selecting the tap or may be a wave guard rotary phase shifter. The down converter mixer shifters and error detector may be constructed from coaxial double balanced mixers which are commercially available.

Figure 10:
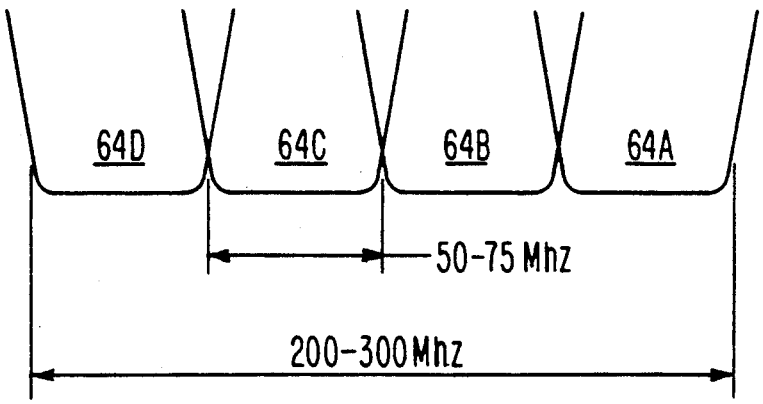
FIG. 10 is a frequency plot diagram showing a plurality of individual sub bands which are covered by a plurality of nulling loops.

Refer now to FIG. 10 showing a hypothetical example frequency plot of a plurality of individual bands which may be covered by a plurality of nulling loops and sampling circuits. In the preferred embodiment data links, the band pass spectrum for the desired data link signal is very broad and preferably of the order of several hundred megahertz of bandwidth, thus, are susceptible to interference signals over a large frequency spectrum. In order to reject the more narrow band interference signals, it is preferred to employ a plurality of nulling control loops of the type shown in FIGS. 6 and 8 having band pass filters 58 and microwave filters 60. In FIG. 6 the nulling circuit is applying a wide band nulling signal via line 41 to summing circuit 35. In FIG. 8, the four nulling circuits are applying their nulling signals on lines 41A to 41D via individual microwave band pass filters 60A to 60D so as to produce narrow cancelling sub bands 64A to 64D which are, for example, 50 to 75 megahertz wide and cover the preselected and desired broad band of 200–300 megahertz of the desired data link signal. It will be noted that the filters 58A to 58D are receiving down converting signals and are IF band pass filters which cover the same down conversion band whereas the filters 60A or 60D are microwave filters which cover the band of the desired data link transmitted signal.

Having explained a preferred embodiment and modifications of the preferred embodiment, it will be understood that the present invention nulling system will cancel out and/or null interference signals which are received in the side lobes and back lobes as well as the main lobe. Further, the novel nulling system is operable as long as the interference signals are not identically polarized with a desired transmitted signal. However, if such identical polarization does occur, the transfer switch explained hereinbefore with respect to FIG. 5 can be activated at the receiving ground station and a signal sent to the remote transmitter which activates a similar transfer switch at the transmitter 11 and antenna 12.

In the preferred embodiment system, the transmitted signal is very near a perfectly circular polarized signal and the transmitting antenna and receiving antenna are very precise so as to provide good isolation between the RH and the LH channels. Stated differently, the more perfect the circular polarization of the transmitted and received signal, the more perfect the isolation between the signal channel and the interference channel.

What is claimed is:

1. An interference nulling system for antennas comprising:
   a receiving antenna of the type having a pair of receiving ports for receiving right hand circular polarized signals and left hand circular polarized signals,
   converter means in said antenna for converting said circular polarized signals at said ports into linear polarized signals,
   a primary signal channel connected to the receiving port for receiving primarily desired data link signals plus some interference signals,
   said primary signal channel comprising signal processing means and a summing circuit having an output coupled to a receiver,
   an interference nulling channel connected to the other receiving port and to said summing circuit for receiving only interference signals and no data link signals and for applying processed interference signals to an input of said summing circuit and for producing an optimized clean desired data link signal output from said summing circuit substantially free of interference signals,
   said interference nulling channel comprising a power divider, adjustable phase control means and adjustable amplitude control means connected in series,
   an interference nulling control loop connected between said power divider and said adjustable phase control means and between said power divider and said adjustable amplitude control means having an adaptive controller for adjusting the phase and amplitude of said processed interference signals applied to the input of said summing circuit;
   error detecting means connected in series in said nulling control loop and having an error signal output connected to said adaptive controller, and
   primary signal channel sampling means coupled to the output of said summing circuit and to an input of said error detecting means for generating an error signal output from said error detecting means which is applied as an input to said adaptive controller indicative of the phase and amplitude of said interference signal in said primary signal channel.

2. An interference nulling system as set forth in claim 1 wherein said receiving antenna comprises a high quality polarizer antenna.

3. An interference nulling system as set forth in claim 2 wherein said received right hand polarized signal are high quality non-elliptical signals.

4. An interference nulling system as set forth in claim 1 wherein said interference nulling control loop and said primary signal channel sampling means both comprise a mixer and a down converter driven by a single local oscillator.

5. An interference nulling system as set forth in claim 4 wherein said error detecting means in said interference nulling control loop comprises a mixer.

6. An interference nulling system as set forth in claim 1 wherein said error detecting means in said interference nulling control loop comprises a double balanced mixer wired to provide a correlator.

7. An interference nulling system as set forth in claim 1 wherein said summing circuit comprises a directional coupler.

8. An interference nulling system as set forth in claim 1 wherein said receiving ports comprise a coaxial hybrid ring connected to said receiving antenna.

9. An interference nulling system as set forth in claim 1 where said receiving ports comprise magic T waveguides connected to said receiving antenna.

10. An interference nulling system as set forth in claim 1 wherein said adjustable amplitude control means comprise a ferrite attenuator.

11. An interference nulling system as set forth in claim 1 wherein said adjustable amplitude control means comprises a pin diode attenuator.

12. An interference nulling system as set forth in claim 1 wherein said adjustable phase control means comprises a tapped delay line.

13. An interference nulling system as set forth in claim 1 wherein said primary signal channel comprises a plurality of summing circuits in series, the last of which is provided with the output coupled to said receiver.

14. An interference nulling system as set forth in claim 13 wherein said interference nulling channel comprises a plurality of series connected adjustable phase control means and adjustable amplitude control means, each being parallel connected between said power divider and one of said plurality of said summing circuits.

15. An interference nulling system as set forth in claim 14 wherein said interference nulling control loop error detecting means comprises a plurality of error detectors, one for each summing circuit and said series connected adjustable phase control means and adjustable amplitude control means.

16. An interference nulling system as set forth in claim 15 wherein said adaptive controller further comprise a plurality of adaptive controllers, one for each error detector.

17. An interference nulling system as set forth in claim 16 wherein said sampling means coupled to the input of said error detecting means comprises a plurality of different pass band pass filters, the output of each one being connected as an input one of said detectors.

18. A method of removing interference signal from desired data link signals, comprising the steps of transmitting high quality right hand circular polarized data link signals to a receiver,
   receiving said high quality transmitted right hand circular polarized data link signals at a high quality receiver having an antenna port adapted to receive only right hand circular polarized signals, said received data link signals containing some interference signals, receiving only intereference signals at a receiver antenna port adapted to receive only left hand circular polarized signals, processing said received interference signals in an interference channel connected to an input of a summing circuit, processing said received data link signals containing some interference signals in a primary signal channel connected to another input of said summing circuit, taking a sample of the interference signals in said primary signal channel free of said data link signals and applying them to an error detector, taking a divided portion of the processed interference signals in said interference channel and applying them to said error detector to produce at the output of said error detector an error signal, applying said error signal to an adaptive controller, and coupling the output of said adaptive controller to adjustable phase and amplitude control means in said interference channel to correlate the interference signal input to said summing circuit with the residual interference signal in said primary signal channel input to said summing circuit to provide an optimized clean data link signal output from said summing circuit.

* * * * *